United States Patent
Olson

(10) Patent No.: US 11,978,084 B2
(45) Date of Patent: *May 7, 2024

(54) DECENTRALIZED COMPUTER SYSTEMS AND METHODS FOR USING A DEBIT NETWORK AS AN INTERMEDIARY BETWEEN DISTRIBUTED LEDGERS

(71) Applicant: Worldpay, LLC, Symmes Township, OH (US)

(72) Inventor: Chandra Olson, Orlando, FL (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,879

(22) Filed: Sep. 29, 2022

(65) Prior Publication Data

US 2023/0015136 A1 Jan. 19, 2023

Related U.S. Application Data

(63) Continuation of application No. 17/303,263, filed on May 25, 2021, now Pat. No. 11,574,333, which is a
(Continued)

(51) Int. Cl.
*G06Q 30/00* (2023.01)
*G06Q 20/26* (2012.01)
(Continued)

(52) U.S. Cl.
CPC ......... *G06Q 30/0226* (2013.01); *G06Q 20/26* (2013.01); *G06Q 20/3829* (2013.01)

(58) Field of Classification Search
CPC . G06Q 30/0226; G06Q 20/26; G06Q 20/3829
See application file for complete search history.

(56) References Cited

U.S. PATENT DOCUMENTS

| 10,108,938 B1 | 10/2018 | Brock et al. |
| 10,115,112 B2 | 10/2018 | Fordyce, III |

(Continued)

FOREIGN PATENT DOCUMENTS

WO 2019016693 A1 1/2019

OTHER PUBLICATIONS

Po-Wei Chen, "Blockchain-based Payment Collection Supervision System using Pervasive Bitcoin Digital Wallet", 2017 IEEE 13th International Conference on Wireless and Mobile Computing, Networking and Communications (WiMob) pp. 139-146.
(Continued)

*Primary Examiner* — Raquel Alvarez
(74) *Attorney, Agent, or Firm* — Bookoff McAndrews, PLLC

(57) ABSTRACT

Decentralized computer systems and methods are disclosed for using a debit network as an intermediary between distributed ledgers. One method includes: receiving, at a first blockchain network from a merchant, transaction information comprising a consumer identification, an issuer identification from a payment vehicle presented for a transaction, and a transaction amount in resources of a first type, wherein the merchant and/or its acquirer are participants of the first blockchain network but the consumer and/or issuer are not participants of the first blockchain network; sending the transaction information to a debit network; identifying, using the debit network, a second blockchain network having the consumer and/or the issuer as participants, using the received consumer identification or issuer identification; and if participants of the second blockchain network accept the transaction, generating a new immutable entry to the second blockchain network indicating a change in the resources of a second type.

20 Claims, 6 Drawing Sheets

Related U.S. Application Data continuation of application No. 15/891,177, filed on Feb. 7, 2018, now Pat. No. 11,049,128.

(51) Int. Cl.
*G06Q 20/38* (2012.01)
*G06Q 30/0226* (2023.01)

(56) References Cited

U.S. PATENT DOCUMENTS

| | | |
|---|---|---|
| 10,659,223 B2 | 5/2020 | Wright et al. |
| 2015/0356690 A1 | 12/2015 | Celikyilmaz et al. |
| 2017/0161768 A1 | 6/2017 | Lopez et al. |
| 2018/0268401 A1 | 9/2018 | Ortiz et al. |

OTHER PUBLICATIONS

Zyskind et al., "Decentralizing Privacy: Using Blockchain to Protect Personal Data," 2015 IEEE CS Security and Privacy Workshops, May 21, 2015, 5 pages.

DECENTRALIZED COMPUTER SYSTEMS AND METHODS FOR USING A DEBIT NETWORK AS AN INTERMEDIARY BETWEEN DISTRIBUTED LEDGERS

CROSS-REFERENCE TO RELATED APPLICATION(S)

This patent application is a continuation of and claims the benefit of priority to U.S. application Ser. No. 17/303,263, filed on May 25, 2021, which is a continuation of and claims the benefit of priority to U.S. application Ser. No. 15/891,177, filed on Feb. 7, 2018, the entireties of which are incorporated herein by reference.

FIELD OF DISCLOSURE

The present disclosure relates generally to the field of payment transactions and, more particularly, to decentralized computer systems and methods for using a debit network as an intermediary between distributed ledgers.

BACKGROUND

Merchants often need to incentivize and track use of their merchandise and services among their consumers. Many merchants and their acquirers try to accomplish these goals by issuing resources that a consumer may use to purchase goods and/or services at other merchants. These resources may be distinct from the normal currency or cryptocurrency that other merchants would typically accept from consumers for their transacted goods or services.

An example of this resource that merchants may use to incentivize and track use of merchandise and services are loyalty points. For example, a merchant may allot loyalty points to a customer when the customer uses a loyalty card to make purchases of goods or services from the merchant or the affiliates of the merchant. In a typical scenario, the consumer can redeem the loyalty points at the specific merchant (e.g., who issued the loyalty card) via a closed loop system. Merchants may provide standalone devices where the customers can swipe their loyalty cards to make purchase with the loyalty points, where the loyalty cards may be physical cards and/or a digital card linked to a phone number. However, in a traditional setting, each merchant may issue its specific resource (e.g., loyalty points) which may be restricted in use to only that merchant. This restriction may overwhelm the consumers because the consumer would have to card around a payment vehicle for each resource type (e.g., physical loyalty card) used by each merchant, as each merchant may issues its own type of resource (e.g., loyalty points). Furthermore, a difficulty may also arise when a consumer would like to transact using a specific type of resource (e.g., loyalty points) at merchants that do not typically transact in such resource, and instead wishes to be paid in a second type of resource (e.g., currency). For example, a casino might issue loyalty points to a consumer for their continued purchase of casino products and services. The consumer may want to occasionally shop at a merchant across the street from the casino that may not yet directly transact using loyalty points issued by the casino.

Therefore, there is a desire for a payment system that encourages consumers of a merchant to sign up for specific resources (e.g., loyalty points) that incentivize consumers to purchase from the merchant and help the merchant track the consumers' usage, while also encouraging other merchants that do not typically use the specific resource to start accepting the specific resource.

For example, there is a desire for a payment system that may allow consumers or patrons to earn loyalty points from online and in person activities (e.g. shopping for goods or services, playing games at casinos, etc.) at one or more merchants and redeem their loyalty card points in a seamless manner at the merchants in and outside of the network of the issuer issuing the loyalty card using existing Point of Sale (POS) solutions. Additionally, the merchants, outside the network, may need a guarantee that they will be paid when accepting loyalty points. Thus, in an environment where various merchants may not be members of the same network as entities providing, for example, loyalty points, there is a desire for a system and method that may act as an intermediary between these networks.

The present disclosure is directed to overcoming one or more of these above-referenced challenges.

SUMMARY

According to certain aspects of the present disclosure, systems and methods are disclosed for using a debit network as an intermediary between distributed ledgers.

In one embodiment, a computer-implemented method is disclosed for using a debit network as an intermediary between distributed ledgers. The method comprising: receiving, at a first blockchain network from a point of sale of a merchant, transaction information comprising at least a consumer identification, an issuer identification from a payment vehicle presented for a transaction of a good or service, and a transaction amount in resources of a first type, wherein the merchant and/or its acquirer are participants of the first blockchain network but the consumer and/or issuer are not participants of the first blockchain network; sending, over a wired or wireless network, the transaction information comprising at least the consumer identification and the issuer identification to a debit network; identifying, using the debit network, a second blockchain network having the consumer and/or the issuer as participants, using the received consumer identification or issuer identification; if all of the participants of the second blockchain network accept the transaction, generating a new immutable entry to a shared ledger of the second blockchain network indicating a change in the resources of a second type for one or more participants of the transaction; and sending, by the debit network, an updated transaction information indicating the change in the resources of the second type to the first blockchain network.

In the above example embodiment, the debit network may be a member of the first blockchain network and the second blockchain network. Furthermore, the resources of the first type may include, for example, an amount in a currency or cryptocurrency, and the resources of the second type may include, for example, loyalty points, or vice versa. A consumer may add loyalty points to the loyalty card by at least one of earning loyalty points by purchasing goods or services provided by the issuer, transferring funds from a financial institution to the loyalty card, and transferring points from another account. In accordance with the above embodiment, the terms and condition associated with the account are at least one of spending limits on the account, marking points as spendable with specific merchants, and rules and regulations accordingly to the policies of the issuer.

The method described in the above embodiment may further include, prior to generating a new immutable entry to the shared ledger of the second blockchain network indicating a transfer of resources, converting, using the second blockchain network, the transaction amount in resources of the first type to an amount of resources of the second type according to a conversion formula in the second blockchain network; and prompting, to participants of the second blockchain network, to validate whether the consumer has the required amount of resources of the second type for the transaction.

In the above-illustrated embodiment, the method may further include, if all of the participants of the first blockchain network accept the updated transaction, prompting, to participants of the first blockchain network, to validate whether one or more participants of the transaction has the required amount of resources of the first type for the transaction; generating a new immutable entry to a shared ledger of the first blockchain network indicating a change in the resources of the first type for one or more participants of the transaction; and sending, by the first blockchain network, a transaction approved message to the point of sale system at the merchant.

In an another embodiment, a decentralized computer system is disclosed for using a debit network as an intermediary between distributed ledgers, the system comprising: a data storage device storing instructions using a processor; and a processor configured to execute the instructions to perform a method including: receiving, at a first blockchain network from a point of sale of a merchant, transaction information comprising at least a consumer identification, an issuer identification from a payment vehicle presented for a transaction of a good or service, and a transaction amount in resources of a first type, wherein the merchant and/or its acquirer are participants of the first blockchain network but the consumer and/or issuer are not participants of the first blockchain network; sending, over a wired or wireless network, the transaction information comprising at least the consumer identification and the issuer identification to a debit network; identifying, using the debit network, a second blockchain network having the consumer and/or the issuer as participants, using the received consumer identification or issuer identification; if all of the participants of the second blockchain network accept the transaction, generating a new immutable entry to a shared ledger of the second blockchain network indicating a change in the resources of a second type for one or more participants of the transaction; and sending, by the debit network, an updated transaction information indicating the change in the resources of the second type to the first blockchain network.

In another embodiment, a non-transitory machine readable medium is disclosed storing instructions that, when executed by a processor, causes the processor to perform a method for using a debit network as an intermediary between distributed ledgers, the method described in at least some embodiments of the present disclosure.

In an example embodiment, the blockchain is accessible by at least one of participants of the shared or distributed ledger and the processor, wherein the at least one participants of shared ledger is a different blockchain on a network node maintained by different transaction participants (e.g., consumers, merchants, acquirers, issuers, etc.). Additionally, in an example embodiment, the blockchain entry comprises at least one of a public key identifying the consumer, a unique private key, a header, and content data.

In an example embodiment, the processor is an observer of the blockchain and the participants of the shared ledger are validators of the transaction. Additionally, the blockchain validators and the observer expose standard hypertext transfer protocol (HTTP) based application program Interfaces (APIs). In the above embodiment, the attributes of the transaction information may be one or more of an identifier of the merchant; an identifier of the consumer; an account information of the merchant; an itemization of the goods and/or services transacted for; a transaction amount; any geographical and/or temporal information of the transaction; any taxes, tips, and/or gratuities; any fees directed towards acquirers, issuers, payment networks; currency exchange rates; and any other pertinent features of the payment transaction.

In another embodiment, the shared or distributed ledger is shared between network nodes associated with different issuers participating in the loyalty program, wherein each network node associated with an issuer keeps its blockchain separate from other network nodes. In the accordance with the above embodiment, the funds for the pending transaction(s) are transferred from a liquidity pool.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

DETAILED DESCRIPTION

Figure 1:
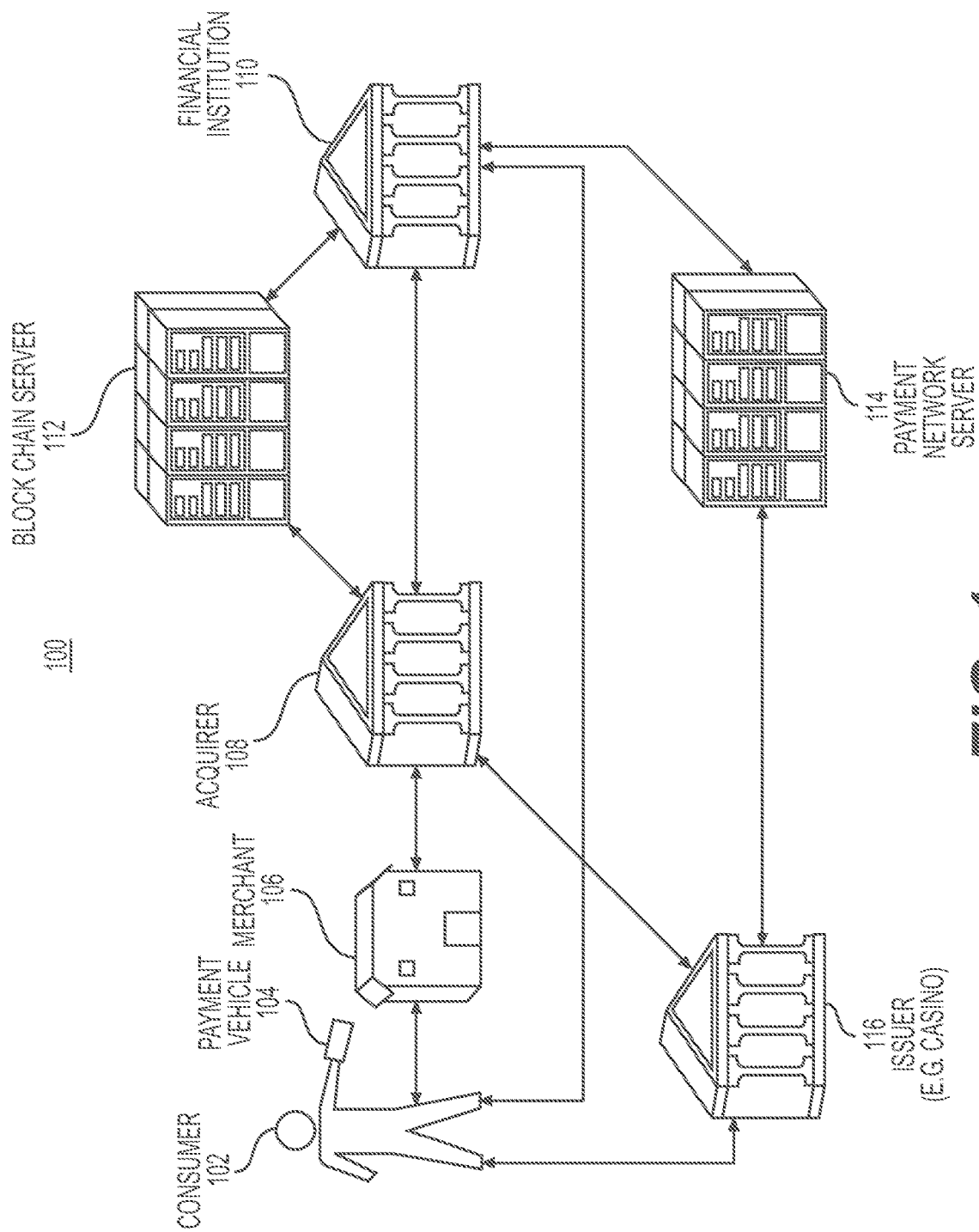
FIG. 1 depicts a blockchain loyalty points payment system for payment transactions using loyalty points, in accordance with non-limiting embodiments.

Various non-limiting embodiments of the present disclosure will now be described to provide an overall understanding of the principles of the structure, function, and use of systems and methods disclosed herein for establishing a loyalty points payment system using blockchain.

As described above, merchants seek ways to incentivize spending and track usage of their customers, one way being through the issuance of a specific alternative resource for spending (e.g., loyalty points). Difficulties arises when a consumer would like to spend such resources with other merchants who may not issue or traditionally accept the alternative resource. Furthermore, if the other merchants were to accept the alternative resource for spending (e.g., loyalty points by the issuing merchant), the other merchants would need some way to guarantee that they would be paid in a resource they may be more used to (e.g., currency (e.g., dollars, pounds, euros, etc.).

Furthermore, existing methods of payment processing of such alternative resources (e.g., loyalty points) may be complicated, lengthy, and cumbersome for issuers, consumers, merchants, and/or acquirers. Consumers may have to carry multiple cards (e.g., each card for a specific resource issued by one or more merchants) and remember to use the resources while purchasing at the specific merchant. Merchant may additionally have to issue and manage distinct resources (e.g., loyalty points) to consumers. In addition, the other merchants that may allow the usage of these resources (e.g., loyalty points) may not be in the same network as the entities (e.g., original merchant or issuer) that issues or facilitate the transfer of the specific resources (e.g., loyalty points) to the consumer. There is thus a desire for a system and method for an intermediary between these various networks. This system may result in less intermediaries between the various transactions occurring in a loyalty points payment system, may allow transaction records to be written to an immutable ledger, and may allow conversion information to be used to facilitate translation to different points types and currencies.

Thus, the embodiments of the present disclosure are directed to a system and method for enabling merchants and consumers to manage and use multiple resources (e.g., loyalty points and normal currency) in an efficient, transparent, and standardized, reducing costs for parties, and minimizing risks, e.g., by using a debit network as an intermediary. In various embodiments, a blockchain may refer to an open, distributed ledger (e.g., "shared permissioned ledger") that can record transactions between parties to a payment transaction efficiently and in a verifiable and a permanent way (e.g., by providing visibility or by being transparent to various participants of the blockchain). A blockchain may be operated by many different parties that come to share consensus. It may maintain a growing list of ordered records, called blocks. Each block may have a timestamp and a link to a previous block. Records may not be altered retroactively. A common analogy for a blockchain may be a digital network of safety deposit boxes. These boxes can secure any digital asset (e.g., currency, securities, loyalty points, contracts). Each box may be locked with a crypto private key. The owner of the box can use their key to unlock the box and push a digital asset to another safety deposit box that is secured by the keys of the recipient. The recipient can then retrieve the digital asset from their safety deposit box.

A blockchain may include one or more of the following features. In some embodiments, a blockchain may include a database, and tabular schemes may be used to encode core data types on top of a traditional database. In such embodiments, tables may consist of blocks, which may be bundles of transactions. Furthermore, such embodiments may be configured so that blockchain transactions may be all or nothing. A blockchain may be rendered immutable, ensuring that the data stored cannot be changed. Each block in the chain may include reference to the previous block so that in chains with a high rate of new transactions, the block may become securely linked to previous blocks. The block may also be replicated numerous times. Cryptography may ensure that users of a blockchain may only edit the parts of the blockchain that they "own" by possessing the private keys necessary to write to the file. Cryptography may also ensure that copies of the distributed blockchain are kept in sync. Distributed ledgers ("shared ledgers") may be used for transaction integrity. Thus, ledgers may be maintained by multiple independent entities on different computing devices. A consensus protocol may be followed by each entity to maintain a consistent view of the ledger. Distributed ledgers provide for greater resiliency against malicious attacks or system failures. Furthermore, a blockchain may be "permissioned"—e.g., allow access to only a specific set of participants. It is contemplated that it may be useful for financial applications to use distributed, centralized, permissioned, tokenless ledgers as a basis for the implementations of various systems and methods presented herein.

Blockchain may have a long-term impact on the financial services industry in paring down transaction settlement time from days to minutes and minimizing the need for intermediaries. Furthermore, it may enable point-to-point exchanges of digital assets without a need for trust between the parties in the exchange. This may eliminate the need for third party engagement in transactions and may reduce the costs involved in verifying a transaction.

As applied to at least some embodiments presented therein, a blockchain having a shared permissioned ledger may be available to participants and may provide visibility to the participants of the blockchain, which may be the parties of a payment transaction initiated by a consumer and originating at a merchant. These parties may include, but are not limited to, the consumer, the merchant at which the transaction originates, the merchant's acquiring bank or institution, and the issuing institution or bank of the consumer. A blockchain process, e.g., as described by various embodiments of the present disclosure, may facilitate a transparent, rules-based, communication process to reduce costs for both merchants and acquirer.

The types of blockchain systems used for payment transactions may include, for example, public blockchains, private blockchains, or a hybrid form of a public and private blockchain (e.g., a consortium blockchain or hyperledger blockchain). In a consortium blockchain, the consortium may include and may be accessible to the participants of the blockchain (e.g., consumers, issuers, merchants, and/or acquirers of a payment transaction). A consortium blockchain may proffer the benefits of setting control of the rules for payment transaction using loyalty points within the bounds as agreed upon by the participants. Thus, the rights to read and/or access the blockchain may be restricted to different participants, based on individual classes or identities of the participants.

In some embodiments, the participants of a blockchain, prior to joining the blockchain, may be vetted, and hence may not be anonymous participants. Vetting may minimize the risk of any form of malicious attacks on the blockchain. In other embodiments, the new entrants to a blockchain may be restricted to those known by other known participants of the blockchain. These blockchains (e.g., a consortium blockchain) may eliminate and/or significantly reduce the risks of attacks that are prevalent, for example, in public blockchains (e.g., 51% attack). The risks may be eliminated and/or significantly reduced due to restrictions placed on the entry of new members. The transactions may resemble the "colored pin" approach of transferring ownership to different participants in the blockchain. It may also be efficient to use certain blockchains (e.g., consortium blockchains) due to the limited number of nodes that may need to be updated and the limited role of verifying the blocks before those are appended to the blockchain.

The members or participants of the blockchain may be represented as nodes of the blockchain. In some embodiments, for example, where the nodes may be "trusted"

and/or be well connected, a blockchain may enable the nodes to easily spot and/or fix any failures or inconsistencies of the blockchain. For example, in a consortium blockchain, payment transactions may be many degrees cheaper compared to their implementation on a public blockchain. Additionally or alternatively, a blockchain may be used that may provide flexibility to develop on the blockchain infrastructure. For example, a Hyper-ledger may be specifically built to expand to other non-traditional use-cases of the blockchain. Since verification may be needed by a comparatively larger number of nodes in the public blockchain as compared to a consortium or private blockchain, a public blockchain may require a high level of computational power than a consortium or private blockchain.

In some embodiments, the blockchain loyalty points payment process may involve a Smart Contracts application. In various embodiments, "Smart Contracts" may refer to a computerized transaction protocol that facilitates, verifies, and/or enforces the negotiation or performance of a contract (e.g., as the one governing a payment transaction using loyalty points). A Smart Contract may satisfy common contractual conditions (e.g., payment terms, liens, confidentiality, enforcement, etc.), minimize malicious and/or accidental exceptions, and/or minimize the need for trusted intermediaries. Different types of algorithms may be employed to offer finality (e.g., of a contract) in a shorter timeframe. Various rules for initiating or managing the loyalty points and payment settlements between parties can be "codified" into the smart contract between the participants. In some embodiments, once the rules have been "codified" into the blockchain, the rules of the Smart Contracts may be rendered or configured to be final and/or immutable during its execution of the Smart Contract.

For example, the blockchain loyalty points payment process may be governed and/or at least initialized using Smart Contracts. Participants of the loyalty points payment process (e.g., consumers, issuers, merchants, acquirers, etc.) may establish the underlying attributes of the contract governing the payment transaction, or the underlying rules of the loyalty points payment process. Smart Contracts may then proceed to execute the payment transaction based on the underlying attribute values or facilitate the loyalty points payment process using the underlying rules.

In some embodiments, cryptographic assurances may be available to the participants. Documents may be captured and securely stored by the blockchain, for example, in an off-the-blockchain storage (e.g. NoSQL database), for retrieval by the other party. Identifiers to these documents may be stored in the blockchain. These documents may include, for example, receipts of purchases, identification information of the consumer, merchant, issuer, or acquirer, available funds or resources, geographical information, or temporal information. One or more examples of these non-limiting embodiments are illustrated in the selected examples disclosed and described in detail with reference made to FIGS. 1-5 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 depicts an illustration of the environment for using a debit network as an intermediary between distributed ledgers 100, in accordance with non-limiting embodiments. At a high level, the environment comprises: a consumer 102 equipped with a payment vehicle 104 from an "issuer" 116; a merchant 106 with an acquiring bank or institution, i.e., "acquirer" 108; a blockchain management server 112 ("blockchain server") or computing system; and a computing system or server 114 ("payment network server") for a payment network used in the transaction. In various embodiments of the present disclosure, the acquirer 108 and the issuer 110 may also refer to the computing system or server of the acquirer 108 or issuer 110, respectively.

Various embodiments of the present disclosure may involve the consumer 102 conducting a payment transaction with merchant 106 using a payment vehicle 104, e.g., a credit card with loyalty points, casino loyalty card, etc. It will be appreciated by those of skill in the art that consumer 102 may present payment vehicle 104 at a POS terminal of merchant 106 to initiate a payment transaction. However, in some embodiments, there may be an online portal of a merchant for the consumer to initiate a payment transaction in lieu of a physical POS terminal. Upon initiation of the payment transaction by a consumer, the merchant and/or the POS terminal of the merchant may transmit transaction information to the acquirer 108 of the merchant. The transaction information may include, for example, information identifying the issuer 110 of the payment vehicle 104 of the consumer 102. The transaction information may be encrypted and entered into a blockchain where the members of a shared ledgers (e.g., nodes) may be able to read and/or access each block of the blockchain.

Figure 2:
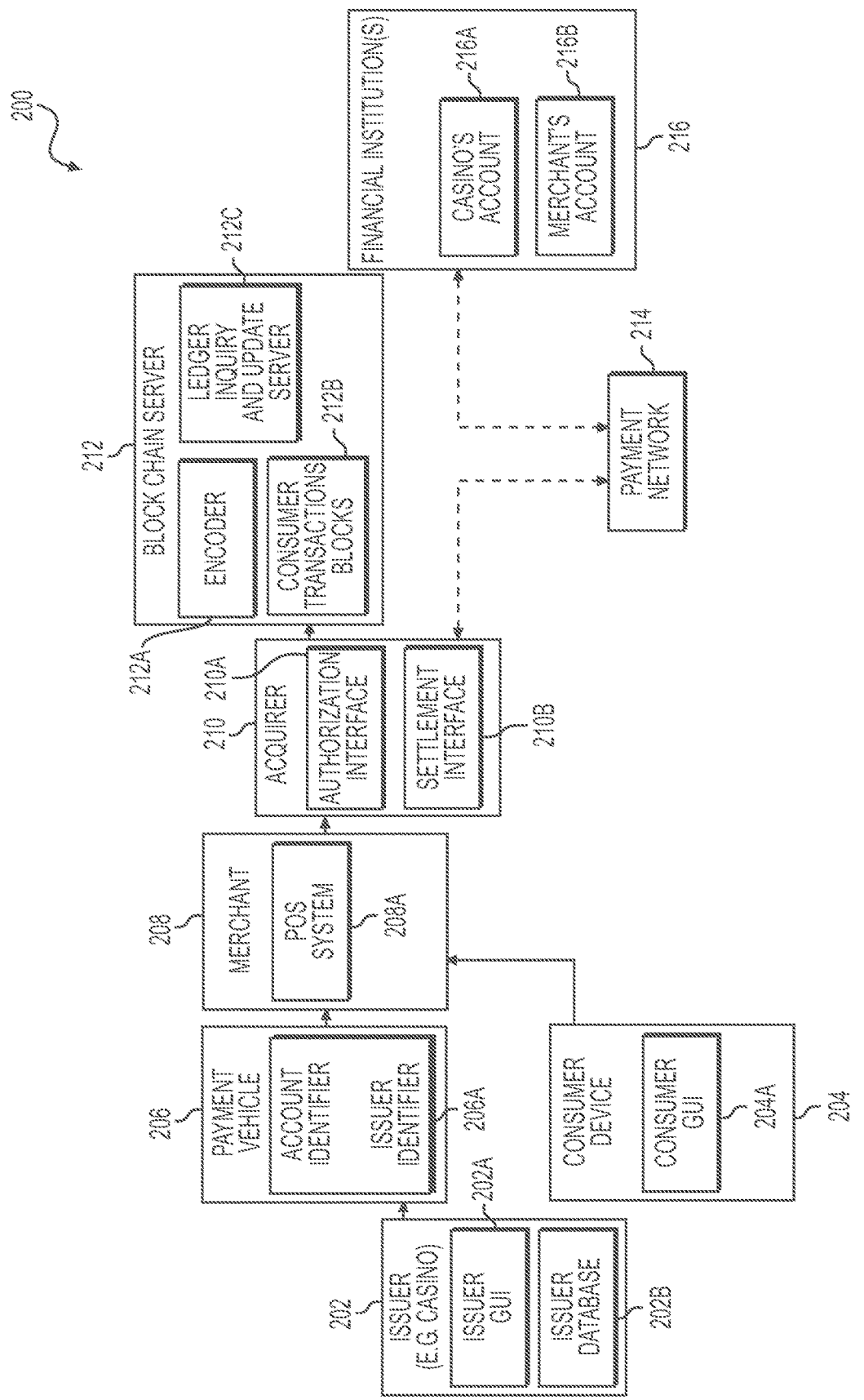
FIG. 2 depicts a detailed schematic of components of the blockchain loyalty points payment system, in accordance with non-limiting embodiments.

FIG. 2 depicts a block diagram of an example of the payment system of FIG. 1 for using a debit network as an intermediary between distributed ledgers, in accordance with non-limiting embodiments. Specifically, the network includes the payment vehicle 206 of a consumer, a consumer device 204 of a consumer, the merchant 208, the acquirer 210, a server or computing system that manages the use of a debit network as an intermediary between blockchain networks or their distributed ledgers ("blockchain server") 212, the payment network server 214, and the financial institution(s) 216.

The payment vehicle 206 may be linked with a loyalty points account of resources or funds defined by an account identifier (e.g., "primary account number (PAN)") and issuer identifier 206A. In one embodiment, the PAN may identify one or more payment source accounts of the consumer, issued or established by a given issuer 202. Unless otherwise specified herein, a payment vehicle 206 may include a physical card including a plastic or metallic card having a magnetic stripe, bar code, or other device or indicia indicative of an account number or other account information, and/or a virtual card, such as a display or screen shot for a mobile phone or for another portable device (e.g., a flash drive, smart chip, a laptop or portable computer), or for a computer device (e.g., a desktop computer) in combination with data indicative of an account number or other account indicative information. It is also contemplated that the payment vehicle 206 may have multiple embodiments or forms. For example, payment vehicle 206 can be a physical card (e.g., in the form of magnetic striped plastic card), a virtual card (e.g., in the form of a display on a smart phone), or both. The virtual card may be communicated by displaying a display or screen shot, and/or by transmitting a signal, such as by using NFC (Near Field Communication) technology or other secure transport technologies to complete the transaction with the selected merchants. Optionally, the virtual card may have a display element (e.g., a bar code or string of numbers) which identifies the account number (e.g., PAN) associated with the card. Alternatively, the virtual card may have display elements relating to the merchants that accept the card.

A consumer, sometimes referred to as the end user, a cardholder, or a card member, may provide identifying information, e.g., via the PAN of the user, to the POS system 208A of the merchant 208 to initiate a transaction with merchant 208 using the consumer's payment vehicle 206. In some cases, the consumer may use a computing device or mobile device ("consumer device" 204) to initiate the transaction, such as for a card-not-present transaction at an online merchant. Thus, payment vehicle 206 may enable the consumer to initiate a transaction with merchant 208 using the payment source associated with the issuer 202 that issued the payment vehicle 206 to the consumer. A consumer may also use the consumer device 204 to oversee, manage, or access details regarding a payment transaction via user interface, such as consumer GUI 204A.

In various embodiments described herein, a merchant 208 may refer generally to any type of retailer, service provider, or any other type of business that is in networked communication with the computing system of an acquiring institution or bank ("acquirer" 210) and uses the payment processing services of acquirer 210. Payment processing services may include receiving and responding to authorization requests as well as facilitating the settlement of funds associated with card-based transactions occurring at merchant 208. In some embodiments, as described herein, the acquirer 210 may use the blockchain server 212 to facilitate the settlement of funds associated with the card-based transactions occurring at merchant 208. A merchant 208 may have one or more POS systems 206A. In various embodiments described herein, a POS system 206A may refer broadly to include POS systems at brick and mortar locations and "virtual" POS systems that can be associated with online retailers or "in-app" purchases. In some cases, a POS system 208A may include a physical terminal, or other network computing system used to facilitate a payment transaction at a location of merchant 208. Each POS system 208A may be generally unmodified or "stock" and simply facilitate the standard transmission of transaction-related information to the acquirer computing system 210, as is known in the art. The transaction-related information may include, but is not limited to, a transaction authorization request ("authorization request"), including but not limited to, a payment amount, loyalty points amount, a date, a time, an account identifier, as well as other types of identifying indicia (e.g., merchant identification). The identifying indicia may vary based on POS system 208A, the type of merchant, and the type of transaction, but example types of identifying indicia may include any of the following: an alternative identifier to the account identifier of the user; a user's name or other user identifier; a merchant identification (MID) identifier; a merchant category code (MCC) identifier; a media access control (MAC) identifier; an internet protocol (IP) identifier; a geographic identifier; and/or a payment type identifier.

Referring now to acquirer computing system 210, authorization interface 210A may receive a transaction authorization request from POS system 208A of merchant 208. The authorization request may comprise various data, including, for example, a MID, a MCC, the cardholder's account identifier 206A, and a transaction amount, among other things. In some embodiments, acquirer computing system 210 may also receive other consumer-identification related data, e.g., an email address, an IP address, etc. In yet another embodiment, the transaction authorization request detail may contain identifying information about the merchant. Once the authorization request is received, acquirer 210 may transmit the transaction authorization request, including the amount of funds required for the transaction ("transaction amount") and the account identifier (or issuer identifier) 206A of the user, received from POS system 208A, to payment network 214 for further processing of the payment transaction. In some embodiments, a component of acquirer computing system 210 (e.g., authorization interface 210A) may also transmit data identifying the acquirer to payment network 214. Still referring to FIG. 2, once the transaction authorization request is delivered to the acquirer 210, the acquirer may further query the blockchain server 212 to further process the transaction. For example, the acquirer may query one or more shared ledger participants about approval of the transaction.

In various embodiments described herein, an issuer 202 may refer to an institution or organization that issues a payment vehicle 206 to the consumer or to the computing system of the institution or organization. The issuer 202 may enable the consumer to use funds from a payment source held by the issuer (e.g. loyalty points). For example, the issuer 202 may be a merchant (e.g. casino) that gives out loyalty points to the consumer. In one embodiment, at least some of the consumer data as it pertains to a payment transaction may be stored in a shared ledger of a blockchain, where the participants of the blockchain include the parties involved in the payment transaction (e.g., consumer, merchant, issuer, acquirer, etc.). In some embodiments, the transaction authorization request made by the acquirer 210 may itself be a block in a blockchain, accessible to the issuer (and other participants of the blockchain) on the shared ledger.

Once the shared ledger approves the transaction, the acquirer may send request to the identified blockchain to withdraw the points. Once loyalty points are withdrawn, a new entry may be published in the blockchain so that participants of the blockchain (e.g., merchant, acquirer, consumer, issuer, etc.) may be informed. The blockchain server 212 may oversee the loyalty points transaction process when one or more participants of the blockchain an attribute of the payment transaction ("transaction information") posted on the shared ledger. The attributes may include, but are not limited to: the identity of the merchant, consumer, acquirer, or issuer of the payment transaction; the transaction amount; an itemization and description of the goods and/or services transacted for; any geographical and/or temporal information of the payment transaction; any taxes, any tips, any discounts; any fees directed towards acquirers, issuers, payment networks; currency exchange rates; etc. In some embodiments, any data for an attribute of the transaction information posted to a blockchain may be encrypted using encoder 212A, for example, to provide security and/or protect sensitive information. Data stored for these attributes may be quantitative (e.g., an amount) and/or qualitative (e.g., name of merchant). In some embodiments, metadata may also be stored. A ledger inquiry and update interface 212C may be one or more of an application, application program interface, software, hardware, server, or protocol that allows the addition of data (e.g., a new attribute or a detail regarding an attribute for the payment transaction) to a blockchain and/or shared ledger. In some embodiments, ledger inquiry and update interface 212C may further enable the access or retrieval of data for any attribute of the transaction information from the shared ledger.

Figure 3:
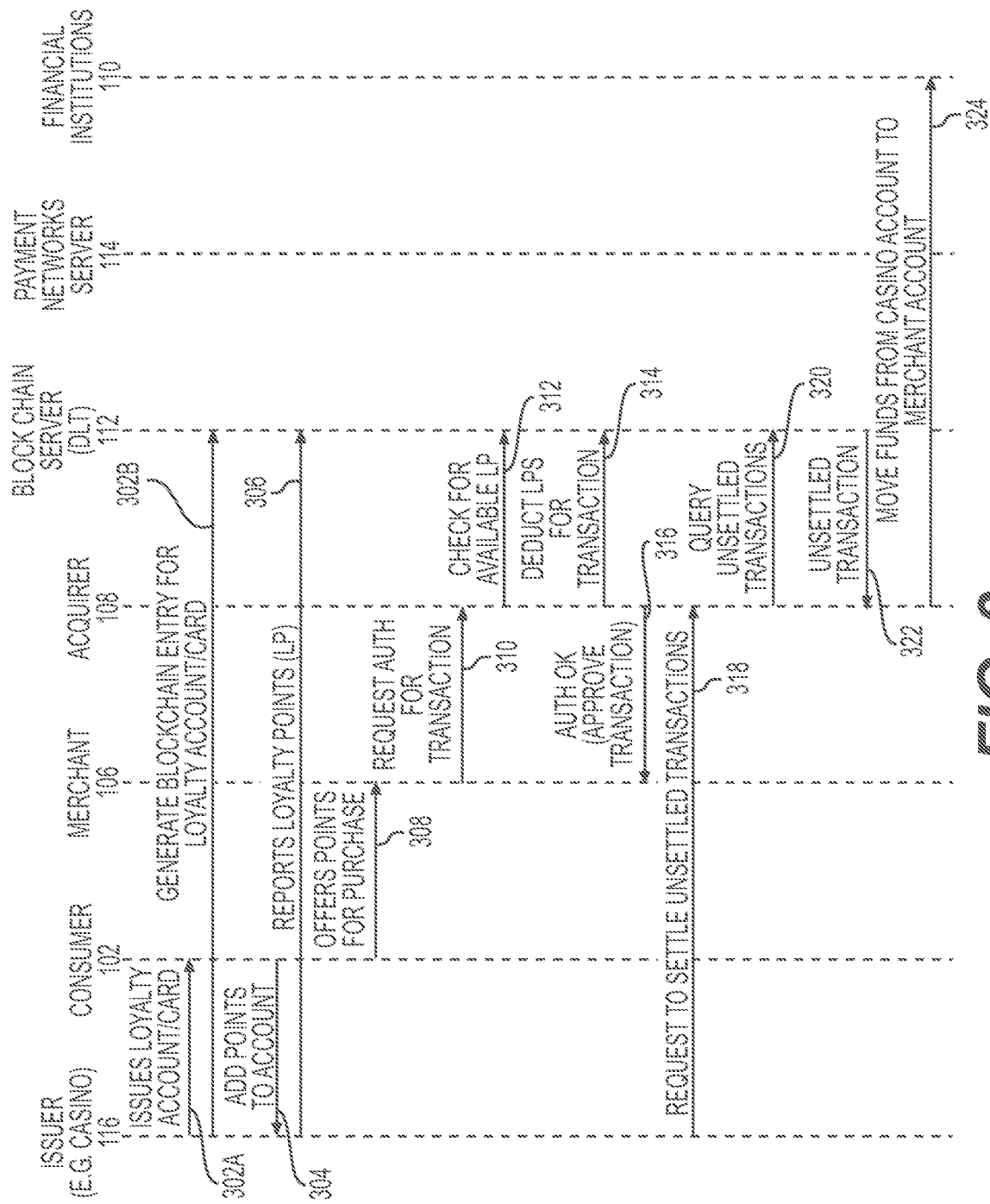
FIG. 3 depicts a simplified sequence flow diagram of a method for efficient loyalty points payment system of FIG. 1 using blockchain, in accordance with non-limiting embodiments.

FIG. 3 depicts a simplified sequence flow diagram of method for establishing loyalty points payment system using blockchain, in accordance with one non-limiting embodiment. In an example embodiment, the method may be executed by the processors, devices, and/or components related to the consumer 102, the issuer 116, the blockchain loyalty points payment system ("blockchain server") 112, the payment network server 114, the acquirer 108, and the merchant 106.

In process flow 302, issuer 116 may issue a loyalty card to consumer 102. For example, issuer 116 may be a casino which issues a loyalty card to a consumer allowing the consumer to play games at the casino or purchase items with the issued loyalty cards. In process flow 304, issuer 116 or a consumer 102 may send a request to add points to the loyalty card associated with the consumer 102 to acquirer 108. The process of adding points to the loyalty card may include causing acquirer 108 to receive, over a wired or wireless network, a request to add loyalty points to the loyalty card by at least one of consumer 102 or issuer 116, wherein the request includes at least one of a consumer's account identification, an account identification, an issuer identification, and a number of points to be added to the loyalty card. The acquirer 108 identifies a network node maintaining a distributed ledger associated with issuer 116 according to the received issuer identification and the account identification.

The acquirer 108 may prompt participants of a distributed ledger to validate whether loyalty points can be added to the identified account. Additionally, if all of the participants of the shared ledger accept the request, acquirer 108 may generate a new immutable entry to the blockchain associated with issuer 116. The generated blockchain entry may include at least one of a public key identifying the consumer, a unique private key, total sum of loyalty points after adding requested after adding requested loyalty points, and terms and condition associated with the points. The acquirer 108 may send an approval message to the point of sale system at merchant 106 once the distributed ledger node(s) approves the transaction.

In an above example embodiment, the consumer may add loyalty points to the loyalty card by at least one of earning loyalty points by purchasing goods or services provided by issuer 116, transferring funds from one or more financial institutions 110 to the loyalty card, and transferring points from another account. In accordance with the above embodiment, the terms and condition associated with the account are at least one of spending limits on the account, marking points as spendable with specific merchants, and rules and regulations accordingly to the policies of the issuer 116. At process flow 306, issuer 116 may report the loyalty points (LP) associated with loyalty points card of consumer 102 to blockchain server 112. In yet another embodiment, the terms and conditions associated with the points may be at least one or more spending limits on a consumer's account, marking points as spendable with specific merchants, and rules and regulations accordingly to policies of issuer 116.

In an example embodiment, as described in operation 318, issuer 116 may request to settle pending transactions to acquirer 108. The request may include at least one of an issuer's account information and routing information associated with a financial institution. In another embodiment, acquirer 108 may query blockchain server 112 for any one or more unsettled transactions, as per operation 320. In the above example embodiment, the acquirer may receive a list of unsettled transactions from blockchain server 112 in operation 322.

Once the pending transactions are identified in operation 320, the acquirer may determine a payment amount to be transferred for settlement between issuer 116 and merchant 106 using conversion information available on at least one distributed ledger entry associated with the at least one pending transaction(s). In the above embodiment, in operation 324, acquirer 108 may further send a request to one or more financial institutions 110 to transfer the determined payment amount from an issuer's account to a merchant's account using a standard payment process for the at least one pending transaction(s) using payment networks server 114.

In operation 308, the consumer may offer points (e.g., via a loyalty card) for purchase at a point of sale of merchant 106. In operation 310, the point of sale of merchant 106 may send an authorization request to acquirer 108. The acquirer 108 may receive a consumer's account identification, an issuer identification, and transaction information for a transaction from a point of sale system as part of a request for authorization for transaction at process 310. The transaction in process 310 may be at least one of an online and/or in-store purchase of good(s) or service(s).

The acquirer processor 108 may identify a network node maintaining a blockchain network associated with the issuer and a consumer blockchain entry according to received issuer and consumer's account identification. Two or more issuers can but need not have nodes in the same blockchain network. It is contemplated that the debit network may have nodes in multiple blockchain networks. For example, acquirer 108 may convert a transaction dollar amount to loyalty points according to a conversion formula in the identified consumer blockchain entry. At operation 312, acquirer 108 may prompt participants of a shared ledger (e.g., 212C of blockchain server 112) to validate whether the consumer blockchain entry has the requisite loyalty points for the transaction. In an example embodiment, the blockchain entry may be accessible by at least one of the participants of the shared ledger and acquirer 108. The at least one participant of the shared ledger may maintain different blockchain(s) on a network node maintained by a different issuer participating in a loyalty program. In an example embodiment, the blockchain entry may comprise at least one of a public key identifying the consumer, a unique private key, a header, loyalty points to currency conversion table, transaction information and content data. In an example embodiment, the distributed ledger entry may comprise at least a unique identifier of the consumer, a header, conversion information between points and currency (i.e., rate at time of conversion), transaction information, and content data.

In one embodiment, acquirer 108 may generate a new immutable entry to the blockchain for the transaction with remaining loyalty points in the loyalty card after deducting the loyalty points required for the transaction if all of the participants of the shared ledger accept the transaction. The acquirer 108 may send a transaction approval message to point of sale system at merchant 106 once the transaction is approved. In some embodiments, acquirer 108 and/or the blockchain loyalty points payment system may encrypt the transaction information using, e.g., an encoder. The encryption may protect sensitive information of the consumer or merchant, and/or restrict the accessibility of the information. The attributes of the payment transaction may include, but are not limited to, e.g., an identification of the merchant, an identification of the consumer, the transaction amount, an itemization of the goods and/or services transacted for, geographical and/or temporal information of the transaction, any taxes, any tips, any discounts; any fees directed towards acquirers, issuers, payment networks; etc.

In some embodiment, the acquirer 108 may receive a rejection message from the blockchain server 212 (e.g., ledger inquiry and update server 212C) if the consumer 102 does not have required loyalty points for the transaction. The acquirer 108 may send the rejection message to the point of sale system of merchant 106. In an alternative embodiment, upon determining that consumer 102 does not have required loyalty points for the transaction, acquirer 108 may further send available dollar amount in the loyalty card to point of system of merchant 106. The point of system may present consumer 102 the dollar amount available in the loyalty card on an interactive graphical user interface (GUI). The acquirer 108 may further provide the point of sale system at merchant 106 an option to choose partial payment using available loyalty points. The point of sale at merchant 106 may be a participant of loyalty program or issuer 116 of the loyalty card. In an alternative embodiment, merchant 106 may not be part of loyalty program nor the issuer 116 of the loyalty card.

The acquirer 108 may update the loyalty points associated with the consumer's account identification in an issuer database 202B upon the approval of the transaction from the shared ledger. Additionally, the loyalty points at issuer database 202B may be accessed by at least one of consumer 102 and issuer 116 using interactive graphical user interface (GUI). In an example embodiment, acquirer 108 may be an observer of the blockchain and/or a participant of its shared ledger.

In some embodiments, ledger inquiry and update interface 212C may enable the access or retrieval of information from the shared ledger. Thus, the ledger inquiry and update interface may respond to requests to add attributes of loyalty points payment transaction and/or search for or retrieve details regarding a transaction attribute. The ledgers and/or subledgers of the blockchain loyalty points payment system may be continually updated, and may be updated to reflect accurate details regarding the payment transaction between participants of the blockchain. The ledger may be updated and/or new details may be posted by adding blocks to the blockchain using pre-defined rules, e.g., agreed on by the participants of the blockchain. In other embodiments, the ledger may be updated and/or new details may be posted, using block chain mining methods known to persons having skill in the art.

Figure 4:
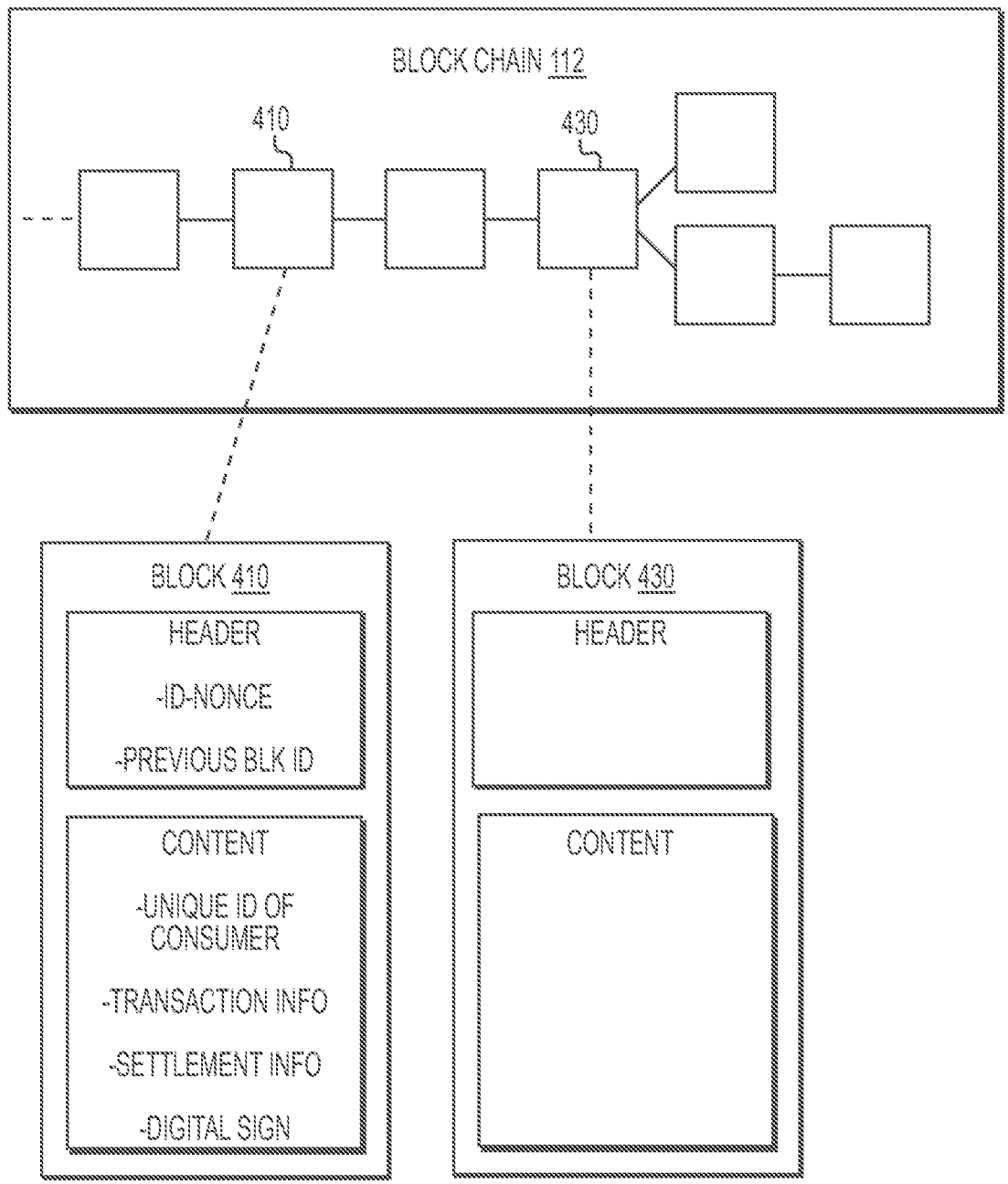
FIG. 4 is an exemplary structure of a blockchain entry according to one or more non-limiting embodiments.

FIG. 4 is an exemplary structure of a blockchain entry, according to one or more non-limiting embodiments. In one embodiment, blockchain structure may comprise one or more block entries (e.g., 410 and 430). A blockchain entry 410 structure may comprise a header and content portion, as shown in FIG. 4. The header may include unique blockchain entry ID and Nonce. The "nonce" in a bitcoin block may be a 32-bit (4-byte) field whose value is set so that the hash of the block will contain a run of leading zeros. Nonce may be a random arbitrary number that is only used once. The blockchain header may also contain previous block entry identification. The second portion of the blockchain entry's content may include information, such as consumer identification, transaction detail, points dollar conversion chart, digital sign of the consumer, merchant identification, etc.

Figure 5:
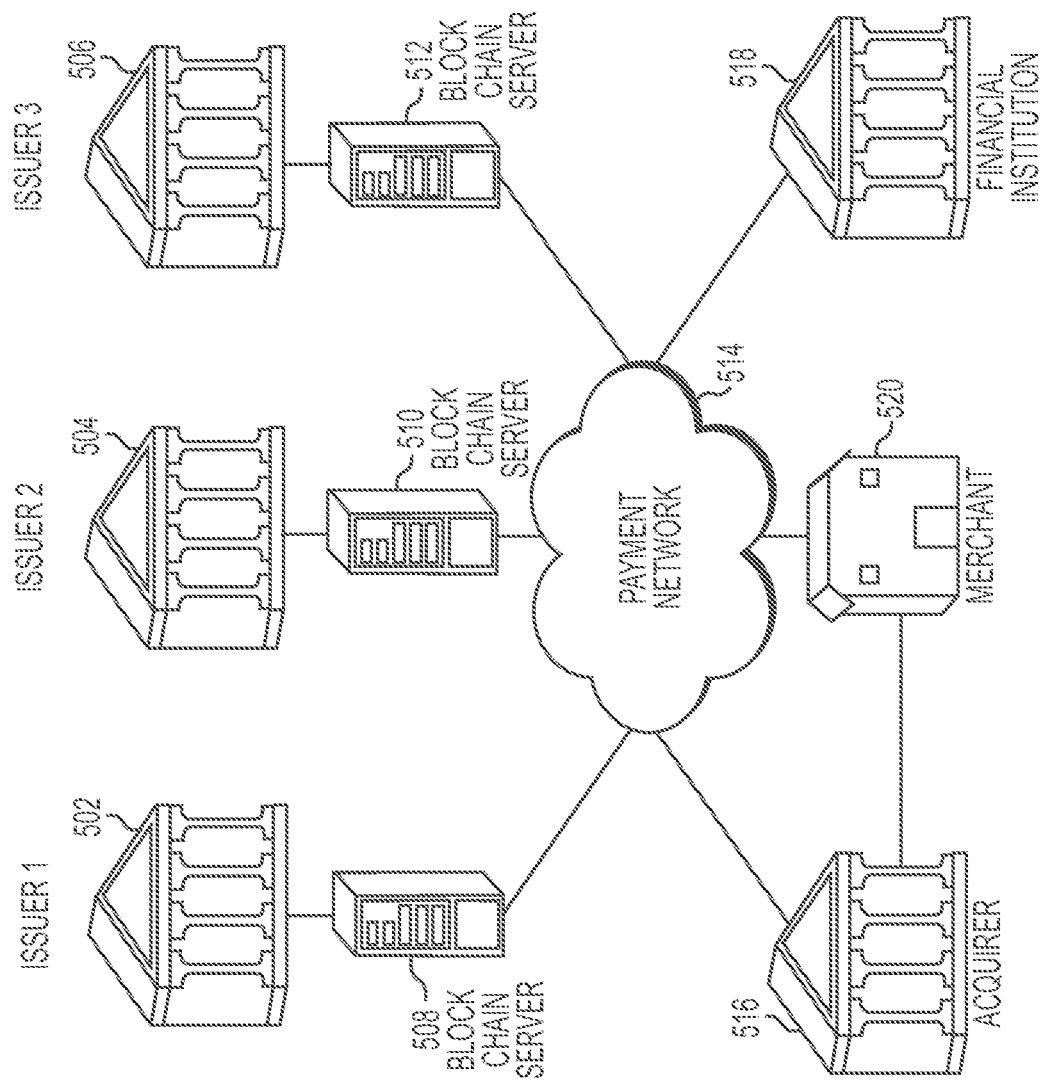
FIG. 5 depicts a blockchain loyalty points payment system involving multiple blockchains for payment transactions using loyalty points.

FIG. 5 depicts block-diagram showing loyalty points payment system involving multiple issuers. In an example embodiment, issuer 1 (502) may be a merchant selling goods, issuer 2 (504) may be a casino providing gaming machines and services, and issuer 3 (506) may be a merchant selling services. The issuers 502, 504, and 506 may issue separate loyalty points memberships to one or more consumers or patrons. The issuers 502, 504, and 506 may mine their own blockchain servers and act as shared ledger to approve and verify transactions involving loyalty points. For example, payment transaction involving loyalty points issued by issuer 2 (504) may be approved by issuer 1 (502) and issuer 3 (506).

In one embodiment, the issuers (502, 504, and 506) may be part of loyalty points payment system using blockchains and issue a loyalty card that is compatible with issuers participating in the distributed ledger payment program. In some embodiments, consumer or patron may play games at the casino using the loyalty card and earn points. The acquirer 516 may request a new blockchain entry to blockchain server 510 after inquiring with block chain servers 508 and 512. Similarly, the patron may use the loyalty points at the casino after inquiring transaction with shared ledger (e.g., 508 and 512).

In another embodiment, the consumer or card member may use the loyalty card at merchant 520, where the acquirer may act as an observer that queries the blockchain servers 508, 510, and 512 for transaction approval and converts the purchase amount into points according to conversion formula provided by the entry into the blockchain network or its distributed ledger. These arrangements may enable the patron to use the loyalty points earned from casinos to a merchant 520 for payment transactions in an efficient and secure manner without requiring the merchant 520 to be aware of available loyalty points or loyalty points conversion. The merchant 520 may be paid the transaction amount from the casino's account at financial institution 518 during settlement process triggered by the acquirer 516.

In various embodiments of the present disclosure, attributes of the payment transaction may refer to, for example, details related to a payment transactions (e.g., an identification of the merchant, an identification of the consumer, the transaction amount, an itemization of the goods and/or services transacted for, geographical and/or temporal information of the transaction, any taxes, any tips, any discounts; any fees directed towards acquirers, issuers, payment networks; currency exchange rates; etc.). In such embodiments, the results and/or process of the transaction(s) may be published in the blockchain or its distributed ledger, which may be readily available to the participants of the blockchain (e.g., issuer, acquirer, consumer, merchant, etc.).

Figure 6B:
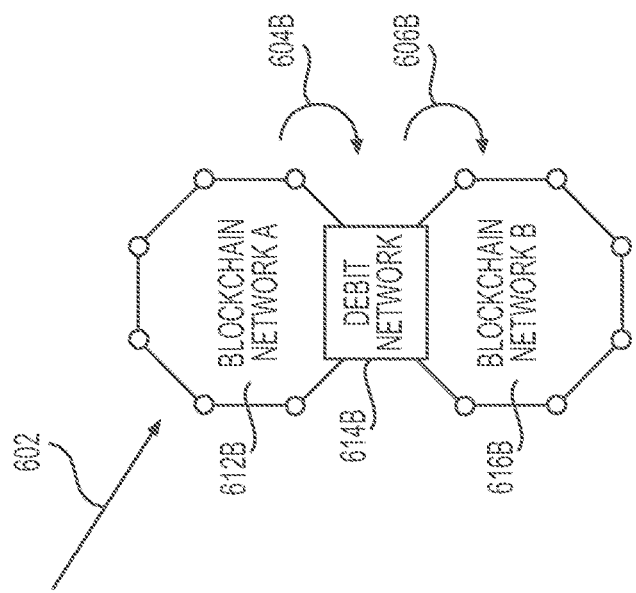
FIGS. 6A-6B depict block diagrams of a general method for using a debit network as an intermediary between distributed ledgers.
Figure 6A:
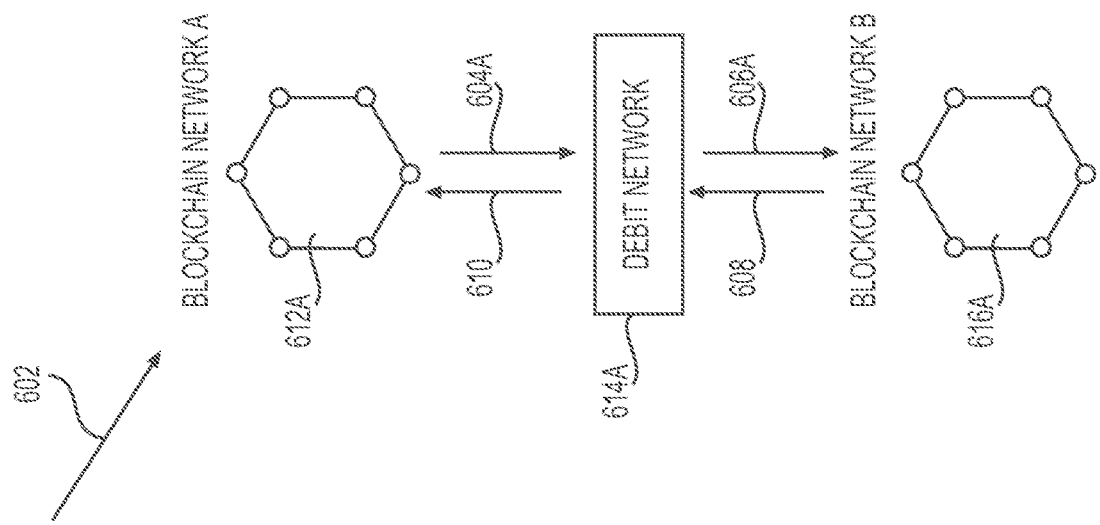

FIGS. 6A-6B depict block diagrams of general methods 600 and 650 for using a debit network as an intermediary between distributed ledgers. It is contemplated that at least some embodiments of the loyalty points payment system utilize the method described in FIGS. 6A-6B. Furthermore, while FIG. 6A may depict an exemplary embodiment where a debit network serves merely an intermediary, FIG. 6B may depict an exemplary embodiment where a debit network may also serve as a member of at least two blockchain networks (and their respective distributed ledgers).

Thus, for both FIGS. 6A and 6B, at step 602, a first blockchain network and/or its distributed ledger (e.g., "distributed ledger A") may receive transaction information, e.g., pertaining to a payment transaction originating at a merchant. For example, this transaction may be initiated by a consumer at a merchant (e.g., casino) for the purchase of a good or service, for currency, cryptocurrency, or tokens (e.g., loyalty points). The received transaction information may include identifiers of various parties of the transaction, e.g., merchant, consumer, acquirer, issuer, etc. The received transaction information may further include the requisite amount of the currency, cryptocurrency, or tokens for the transaction. In some embodiments, the received transaction information may also include, e.g., a description or identification of the requested good or service, fraud information, configuration plans for loyalty points, etc. The transaction information may be received from a computing system, processor, and/or server of one or more participants of the transaction (e.g., consumer, issuer, merchant, acquirer, etc.), a POS system of a merchant or acquirer, a server pertaining to the system for using the debit network as an intermediary for distributed ledger, and/or a third party.

Referring to FIG. 6A, at step 604A, the blockchain network or server for distributed ledger A may process the received transaction and determine whether the received transaction information is intended for a party that is not a member of the blockchain network (or distributed ledger) A. If it is determined that the received transaction information is intended for a party that is not a member of the blockchain network (or distributed ledger) A, step 604A may further include relaying all or at least some of the transaction information to debit network 614A. The relayed transaction information may include, for example, the information intended for the party that is not a member of blockchain network A 612A (or its distributed ledger).

Debit network may serve as an intermediary for two or more blockchain networks and/or their distributed legers. Each blockchain network and/or their distributed ledgers may serve a function or role for payment transactions, and/or may comprise of different sets of transaction participants. Debit networks may be integrated into blockchain networks by having a node in a blockchain network. In some embodiments, debit networks can also be integrated into blockchain networks by having the participants in the transaction be a member of the blockchain network and those participants communicating both with the blockchain and with the debit network.

At step 606A, debit network may identify the intended party in the relayed transaction information and locate the blockchain network (or its distributed ledger) in which the intended party is a member (e.g., blockchain network B 616A or its distributed ledger). Step 606A may further include further relaying at least some or all of the previously relayed transaction information to the located blockchain network (or its distributed ledger) in which the intended party is a member (e.g., blockchain network B 616A or its distributed ledger).

At step 608, blockchain network B 616A (or its distributed ledger) may use the relayed transaction information to perform a specific function. For example, blockchain network B may record the completion of the transaction using the relayed transaction information. The recordation into the distributed ledger may be performed e.g., using a consensus mechanism involving participants of blockchain network B. In one embodiment, the completion of the transaction may involve, for example, the recordation of the transfer of currency, cryptocurrency, or tokens (e.g., loyalty points) between two or more participants of the transaction. Alternatively or additionally, the specific function at blockchain network B may be a transfer of a currency, cryptocurrency, and/or tokens (e.g., loyalty points) that is distinct from a transfer of a currency, cryptocurrency, and/or tokens (e.g., loyalty points) that may be performed at blockchain network A. For example, in blockchain network B, a distributed ledger may record the transfer and/or use of loyalty points used for a purchase at a merchant, according to methods described in the present disclosure. In such an example, in blockchain A, a distributed ledger may record the appropriate funds transferred to the merchant from a casino or loyalty points provider based on a conversion formula of currency to and from loyalty points, according to methods described herein. It is contemplated that in some embodiments, the roles played by blockchain A and B may be reversed. Once blockchain network B fulfils its function, it may transmit updated transaction information to debit network 614A.

Subsequently, at step 610, debit network may relay the updated transaction information to blockchain network A 612A (or its distributed ledger). The updated transaction information may prompt blockchain network A 612A (or its distributed ledger) to serve another function, for example, finalizing a recording (e.g., consensus) on the distributed ledger. In one embodiment, the updated transaction information received from blockchain network B may include the recorded transfer and/or use of loyalty points for a transaction originating at a merchant. In such an embodiment, at blockchain network A, a distributed ledger may record the transfer of the appropriate funds (in currency or cryptocurrency) that is commensurate with the transfer and/or use of loyalty points to the merchant.

FIG. 6B may depict an exemplary embodiment where a debit network may also serve as a member of at least two blockchain networks (and their respective distributed ledgers). Thus, at 604B, the blockchain network A 612B may process the received transaction and determine whether the received transaction information is intended for debit network 614B. However, debit network 614B may also be a member of blockchain network B (and its distributed ledger). If it is determined that the received transaction information is intended for debit network 614B, then debit network 614B may receive all or at least some of the transaction information received from step 602.

In such embodiments, while debit network 614B may serve as an intermediary for two or more blockchain networks and/or their distributed legers, debit network 614B may also be a member of the two or more blockchain networks. Thus, at least in some embodiments, debit network 614B may readily receive or transmit information intended for either blockchain network via their shared ledgers. Each blockchain network and/or their distributed ledgers may serve a function or role for payment transactions, and/or may comprise of different sets of transaction participants.

At step 606B, being also a member of blockchain network B, debit network 614B may relay or distribute at least some or all of the received transaction information from blockchain network A 612A (or its distributed ledger) to blockchain network B 616B (or its distributed ledger). Thereafter, in some embodiments, steps 608 and 610 may be performed, as described above.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

It is intended that the specification and examples be considered as exemplary only, with a true scope and spirit of the invention being indicated by the following claims.

What is claimed is:

1. A computer-implemented method for using a debit network as an intermediary between distributed ledgers, the method comprising:
   receiving, at a first blockchain network from a point of sale of a merchant, transaction information comprising at least a transaction amount in resources of a first type, wherein a debit network is a participant of the first blockchain network;
   identifying, using the debit network, a second blockchain network using the transaction information, wherein the debit network is a participant of the second blockchain network;
   converting, using the second blockchain network, the transaction amount in resources of the first type to an amount of resources of the second type;
   generating a new immutable entry to a shared ledger of the second blockchain network indicating a change in the resources of the second type for one or more participants of the transaction; and
   sending, by the debit network, an updated transaction information indicating the change in the resources of the second type to the first blockchain network.

2. The method of claim 1, further comprising, sending, by the first blockchain network, a transaction approved message to the point of sale system at the merchant.

3. The method of claim 1, wherein the transaction information further comprises at least a consumer identification and an issuer identification from a payment vehicle presented for a transaction of a good or service, and
   wherein the merchant and/or its acquirer are participants that access the first blockchain network and the second blockchain network is accessed by the consumer and/or the issuer as participants.

4. The method of claim 3, wherein the participants of the transaction includes one or more of: the consumer, the merchant, the issuer, or the acquirer.

5. The method of claim 3, wherein the payment vehicle presented for the transaction of the good or service identifies the issuer and an account for one or more of the resources of the first type or resources of the second type belonging to the consumer.

6. The method of claim 3, further comprising, prior to receiving transaction information from a point of sale of a merchant:
   issuing, by the issuer, a payment vehicle to the consumer for acquiring resources of the second type, wherein the payment vehicle is at least one of physical card and digital card compatible to the debit network or the second blockchain network;
   adding resources of the second type to the payment vehicle by at least one of the consumer or the issuer;
   generating, via a wired or wireless network, a blockchain entry to the second blockchain network, wherein the blockchain entry includes resources of the second type to be added and terms and condition associated with the resources of the second type; and
   reporting the amount of resources of the second type to a shared ledger of the second blockchain network.

7. The method of claim 3, wherein the issuer identification from the payment vehicle identifies one or more of: (1) an account of the consumer for acquiring or deducting resources of the first type, and (2) the account of the consumer for acquiring or deducting resources of the second type.

8. The method of claim 1, further comprising, subsequent to generating the new immutable entry to the shared ledger of the second blockchain network:
   sending, over a wired or wireless network, an updated transaction information indicating the change in the resources of the second type to the debit network.

9. The method of claim 3, further comprising, prior to generating a new immutable entry to the shared ledger of the second blockchain network indicating a transfer of resources:
   prompting, to participants of the second blockchain network, to validate whether the consumer has a required amount of resources of the second type for the transaction.

10. The method of claim 9, wherein the resources of the first type comprises an amount in a currency or cryptocurrency, and the resources of the second type comprises loyalty points.

11. The method of claim 9, wherein the new immutable entry includes at least one of a public key identifying the consumer, a unique private key, a sum of loyalty points after adding requested loyalty points, and terms and condition associated with the points.

12. The method of claim 1, further comprising, based on all of the participants of the first blockchain network accepting the updated transaction, prompting, to participants of the first blockchain network, to validate whether one or more participants of the transaction has a required amount of resources of the first type for the transaction.

13. The method of claim 12, further comprising, generating a new immutable entry to a shared ledger of the first blockchain network indicating a change in the resources of the first type for one or more participants of the transaction.

14. A decentralized computer system for using a debit network as an intermediary between distributed ledgers, the system comprising:
   a data storage device storing instructions for processing a transaction using one or more blockchain networks;
   two or more distinct blockchain networks;
   a debit network;
   and a processor configured to execute the instructions to perform a method including:
   receiving, at a first blockchain network from a point of sale of a merchant, transaction information comprising at least a transaction amount in resources of a first type, wherein a debit network is a participant of the first blockchain network;
   identifying, using the debit network, a second blockchain network using the transaction information, wherein the debit network is a participant of the second blockchain network;
   converting, using the second blockchain network, the transaction amount in resources of the first type to an amount of resources of the second type;
   generating a new immutable entry to a shared ledger of the second blockchain network indicating a change in the resources of the second type for one or more participants of the transaction; and
   sending, by the debit network, an updated transaction information indicating the change in the resources of the second type to the first blockchain network.

15. The system of claim 14, wherein the processor is further configured for:
   sending, by the first blockchain network, a transaction approved message to the point of sale system at the merchant.

16. The system of claim 14, wherein the transaction information further comprises at least a consumer identification and an issuer identification from a payment vehicle presented for a transaction of a good or service, and
wherein the merchant and/or its acquirer are participants that access the first blockchain network and the second blockchain network is accessed by the consumer and/or the issuer as participants.

17. The system of claim 16, wherein the processor is further configured for, prior to generating a new immutable entry to the shared ledger of the second blockchain network indicating a transfer of resources:
prompting, to participants of the second blockchain network, to validate whether the consumer has a required amount of resources of the second type for the transaction.

18. The system of claim 14, wherein the processor is further configured for, based on all of the participants of the first blockchain network accepting the updated transaction:
prompting, to participants of the first blockchain network, to validate whether one or more participants of the transaction has a required amount of resources of the first type for the transaction.

19. The system of claim 18, wherein the processor is further configured for:
generating a new immutable entry to a shared ledger of the first blockchain network indicating a change in the resources of the first type for one or more participants of the transaction.

20. A non-transitory machine readable medium storing instructions that, when executed by a processor, causes the processor to perform a method for using a debit network as an intermediary between distributed ledgers, the method including:
receiving, at a first blockchain network from a point of sale of a merchant, transaction information comprising at least a transaction amount in resources of a first type, wherein a debit network is a participant of the first blockchain network;

identifying, using the debit network, a second blockchain network using the transaction information, wherein the debit network is a participant of the second blockchain network;

converting, using the second blockchain network, the transaction amount in resources of the first type to an amount of resources of the second type;

generating a new immutable entry to a shared ledger of the second blockchain network indicating a change in the resources of the second type for one or more participants of the transaction; and sending, by the debit network, an updated transaction information indicating the change in the resources of the second type to the first blockchain network.

* * * * *